United States Patent Office 3,118,870
Patented Jan. 21, 1964

3,118,870
WATER-INSOLUBLE MONOAZO-DYESTUFFS
Erich Dietz, Kelkheim, Taunus, Günther Semler, Heppenheim, Bergstrasse, and Arthur Siebert, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 19, 1962, Ser. No. 180,801
Claims priority, application Germany Mar. 29, 1961
7 Claims. (Cl. 260—154)

The present invention provides new water-insoluble monoazo-dyestuffs and a process for preparing them, in particular it provides dyestuffs of the general formula

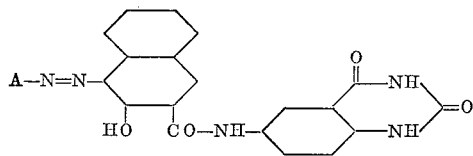

in which A represents a radical of the benzene series which may be substituted in the benzene nucleus by groups that do not impart solubility in water.

We have found that valuable water-insoluble monoazo-dyestuffs are obtained by coupling in substance or on a substratum a diazonium compound of a primary amine of the benzene series which may be substituted in the benzene nucleus by groups that do not impart solubility in water, with 6-(2'-hydroxy-3'-naphthoylamino)-2,4-dioxo-1,2,3,4-tetrahydroquinazoline.

As diazo components there are used primary amines of the benzene series, such for example as aminobenzene, 1-amino-2-chlorobenzene,
1-amino-3-chlorobenzene,
1-amino-4-chlorobenzene,
1-amino-2-bromobenzene,
1-amino-2-methylbenzene,
1-amino-4-methylbenzene,
1-amino-2-methoxybenzene,
1-amino-2-nitrobenzene,
1-aminobenzene-2-carboxylic acid methyl ester,
1-aminobenzene-2-carboxylic acid ethyl ester,
1-aminobenzene-4-carboxylic acid methyl ester,
1-amino-2-methyl-4-chlorobenzene,
1-amino-2-methyl-5-nitrobenzene,
1-amino-2,5-dichlorobenzene,
1-amino-2-chloro-4-nitrobenzene,
1-amino-2-chlorobenzene-4-carboxylic acid ethyl ester,
1-amino-2-bromobenzene-5-carboxylic acid methyl ester,
1-amino-2-methoxy-5-chlorobenzene,
1-amino-2-methoxy-4-nitrobenzene,
1-amino-2-methoxy-5-nitrobenzene,
1-amino-2,5-dimethoxybenzene,
1-amino-2-methoxy-5-benzylsulfonyl-benzene,
1-amino-5-nitrobenzene-2-carboxylic acid methyl ester,
1-amino-5-chlorobenzene-2-carboxylic acid methyl ester,
1-amino-3-chlorobenzene-4-carboxylic acid methyl ester,
1-amino-4-chlorobenzene-3-carboxylic acid ethyl ester,
1-aminobenzene-3-carboxylic acid amide,
1-aminobenzene-3-carboxylic acid methylamide,
1-aminobenzene-3-carboxylic acid phenylamide,
1-amino-6-chlorobenzene-3-carboxylic acid amide,
1-amino-6-methylbenzene-3-carboxylic acid amide,
1-amino-6-methoxybenzene-3-carboxylic acid amide,
1-amino-6-methoxybenzene - 3 - carboxylic acid phenylamide,
1-amino - 6 - methoxybenzene - 3 - carboxylic acid-(2'-methyl-3'-chloro)-phenylamide,
1-amino - 6 - methoxybenzene - 3 - carboxylic acid-(2',4'-dimethyl)-phenylamide,
1-amino - 6 - methoxybenzene - 3 - carboxylic acid-(2'-chloro)-phenylamide,
1-amino - 6 - methoxybenzene - 3 - carboxylic acid-(2',5'-dichloro)-phenylamide,
1-amino - 6 - methylbenzene - 3 - carboxylic acid-(2',5'-dichloro)-phenylamide,
1-amino - 6 - chlorobenzene - 3 - carboxylic acid-(2',5'-dichloro)-phenylamide,
1-aminobenzene-4-carboxylic acid amide,
1-aminobenzene-4-carboxylic acid methylamide
or 1-aminobenzene-4-carboxylic acid phenylamide.

The amines are diazotized in the usual manner and the diazonium compounds are coupled in an alkaline medium, preferebaly in a neutral to weakly acid medium with 6-(2'-hydroxy - 3' - naphthoylamino)-2,4-dioxo-1,2,3,4-tetrahydro-quinazoline. It may be advantageous to add non-ionic, anionic or cationic surface-active compounds.

The coupling component used in the present invention for the preparation of the monoazo-dyestuffs can be prepared by known methods, for example by reacting 2-hydroxy-3-naphthoic acid chloride with 6-amino-2,4-dioxo-1,2,3,4-tetrahydroquinazoline in a solvent which is suitable for this reaction, for example toluene or pyridine.

Some of the dyestuffs obtained by this invention possess a hard grain. In order to obtain the full tinctorial strength they may be heated in the form of their aqueous pastes under pressure to temperatures above 100° C., preferably to 120° to 180° C., if desired, with the addition of alcohols or other organic solvents. The aqueous pastes or the dry dyestuffs may also be subjected to an after-treatment with organic solvents. For this after-treatment it has proved advantageous to use compounds, such as for example nitrobenzene, orthodichlorobenzene, pyridine, formamide, dimethylformamide, N-methylacetamide or phosphoric acid trisdimethylamide, if desired at a raised temperature.

This after-treatment can be avoided by coupling in the presence of anion-active, cation-active or non-ionic emulsifiers, such as the sodium salt of paraffinsulfamido-acetic acid (the basic paraffin radical corresponds to a hydrocarbon fraction of the boiling range beween 180° and 210° C.), oleylamine acetate, distearyl-dimethyl-ammonium chloride or the reaction product of 1 mol of oleyl alcohol and 30 mols of ethylene oxide or emulsifier mixtures, or by treating the dyestuffs, after the coupling, in an aqueous suspension at a raised temperature with a water-insoluble organic solvent, if desired in the presence of an emulsifier.

The new monoazo-dyestuffs are water-insoluble pigments which are distinguished by a very good fastness to solvents and a good to very good fastness to overspraying, to migration and to light.

They are suitable for the preparation of printing inks and colored lacquers, furthermore for coloring rubber, natural resins and polymerization or condensation synthetic resins, particularly, however, for fast coloring polyvinyl chloride. The products obtainable by this invention may also be used for dyeing in the spinning solution, as well as for dyeing and printing textiles and paper according to the usual pigment printing and pigment dyeing methods.

The following examples serve to illustrate the invention but they are not intended to limit it thereto, the parts and percentages being by weight unless otherwise stated, and the relationship of parts by weight to parts by volume being the same as that of the kilogram to the liter.

*Example 1*

14 parts of 1-amino-2-nitrobenzene are stirred over night with 50 parts by volume of water and 60 parts by volume of 5 N-hydrochloric acid and then diazotized at 0° C. after the addition of ice, with 20 parts by volume of 5 N-sodium nitrite solution.

Furthermore, 38 parts of 6-(2'-hydroxy-3'-naphthoylamino)-2,4-dioxo-1,2,3,4-tetrahydro-quinazoline are dissolved in 600 parts by volume of water and 150 parts by volume of 2 N-sodium hydroxide solution. This solution of the coupling component is introduced after the addition of 10 parts by volume of a 10% aqueous solution of an emulsifier, for example the reaction products of 1 mol of oleyl alcohol and 30 mols of ethylene oxide, together with the diazo solution into a vigorously stirred buffer solution consisting of 500 parts by volume of water, 150 parts by volume of 2 N-acetic acid, 150 parts by volume of 4 N-sodium acetate solution and 10 parts by volume of a 10% aqueous solution of the emulsifier described above. The coupling is complete immediately after the addition of the components. The mixture is then heated for 30 minutes at 95° to 100° C. by introducing steam, whereby the color of the previously red brown products turns into red. The dyestuff is suction-filtered, washed thoroughly with water and dried in a cabinet by circulating air at 60° to 80° C.

50 parts of a red pigment possessing a good fastness to light and to solvents are obtained.

*Example 2*

15.1 parts of 1-aminobenzene-2-carboxylic acid methyl ester are dissolved in a mixture of 300 parts by volume of water and 65 parts by volume of 5 N-hydrochloric acid, diazotized at 0° to 5° C. with 20 parts by volume of 5 N-sodium nitrite solution and diluted with water to 800 parts by volume.

Furthermore, 38 quarts of 6-(2'-hydroxy-3'-naphthoylamino)-2,4-dioxo-1,2,3,4-tetrahydro-quinazoline are suspended in 500 parts by volume of hot water and dissolved by the addition of 150 parts by volume of 2 N-sodium hydroxide solution. After the addition of 10 parts by volume of a 10% aqueous solution of the reaction product of 1 mol of oleyl alcohol and 30 mols of ethylene oxide, the solution is made up to 800 parts by volume by adding water.

The two solutions are simultaneously added dropwise within 1 hour to a mixture at 90° C. of 300 parts by volume of 2 N-sodium acetate solution, 150 parts by volume of 2 N-acetic acid and 10 parts by volume of a 10% aqueous solution of the aforesaid emulsifier. After a few minutes the coupling is complete.

The dyestuff so obtained is suction-filtered, washed with water and dried. 52 parts of a pigment having a hard grain and a low tinctorial strength are obtained.

In order to obtain the full tinctorial strength the product is stirred within 45 minutes at 180° to 190° C. with 400 parts by volume of nitrobenzene, filtered after cooling and washed with methanol; the residue of the nitrobenzene is distilled off with steam. After filtering and drying 44 parts of a red pigment having a very soft grain, a high tinctorial strength and a very good fastness to solvents, to migration and to light are obtained.

An identical product is obtained by using for the aftertreatment instead of nitrobenzene other solvents, for example formamide or dimethylformamide.

*Example 3*

19.6 parts of 1-amino-5-nitrobenzene-2-carboxylic acid methyl ester are diazotized at 0° to 5° C. in 300 parts by volume of water with 65 parts by volume of 5 N-hydrochloric acid and 20 parts by volume of 5 N-sodium nitrite solution.

Furthermore, 36 parts of 6-(2'-hydroxy-3'-naphthoylamino)-2,4-dioxo-1,2,3,4-tetrahydro-quinazoline are dissolved in 500 parts by volume of water and 150 parts by volume of 2 N-sodium hydroxide solution; 300 parts by volume of 2 N-sodium acetate solution and 10 parts by volume of a 10% aqueous solution of the emulsifier described in Example 2 are added and the coupling component is precipitated in a state of fine subdivision by the addition of 150 parts by volume of 2 N-acetic acid. To the suspension so obtained the abovementioned diazo solution is added dropwise within 1 hour at room temperature. After further 30 minutes the coupling is complete. The coupling mixture is then heated for 30 minutes at 90° to 95° C. by introducting steam, suction-filtered, washed thoroughly with water and dried. 54 parts of a pigment dyestuff having a hard grain and a low tinctorial strength are obtained.

By treating the product so obtained for 1 hour at boiling temperature in 140 parts by volume of pyridine, diluting the mixture after cooling with methanol, suction-filtering, washing with methanol and drying, 46 parts of a red pigment having a high tinctorial strength, a soft grain, a very good fastness to solvents and to migration and a good fastness to light are obtained.

*Example 4*

18.4 parts of 1-amino-5-chlorobenzene-2-carboxylic acid methyl ester are diazotized in 60 parts by volume of 5 N-hydrochloric acid and 200 parts by volume of ice water with 20 parts by volume of 5 N-sodium nitrite solution. The clarified diazo solution is introduced within about 30 minutes, together with the solution of 38 parts of 6-(2'-hydroxy-3'-naphthoylamino)-2,4-dioxo-1,2,3,4-tetrahydro-quinazoline in 150 parts by volume of 2 N-sodium hydroxide solution and 500 parts by volume of water, into a mixture of 400 parts by volume of water, 150 parts by volume of 2 N-acetic acid, 150 parts by volume of 4 N-sodium acetate solution and 15 parts by volume of a 10% aqueous solution of the sodium salt of the condensation product of oleic acid chloride and N-methyltaurine.

When the coupling is complete, the mixture is heated for 20 minutes at 95° to 100° C. by introducing steam, suction-filtered and thoroughly washed with water. After drying 58 parts of a product having a hard grain and a low tinctorial strength are obtained which is heated for 1 hour to boiling temperature in 350 parts by volume of dimethylformamide. After cooling to 60° to 70° C., the mixture is diluted with 350 parts by volume of methanol, suction-filtered, washed with methanol and then with water and dried in a cabinet by circulating air at 60° C.

52 parts of a brilliant red pigment dyestuff possessing a very good fastness to light, to solvents and to migration are obtained.

*Example 5*

16.2 parts of 1-amino-2,5-dichlorobenzene are stirred overnight in 80 parts by volume of 5 N-hydrochloric acid and diazotized at 0° to 5° C. after the addition of ice with 20 parts by volume of 5 N-sodium nitrite solution. The clarified diazo solution is then coupled, as described in Example 4, with 38 parts of 6-(2'hydroxy-3'-naphthoylamino) - 2,4 - dioxo - 1,2,3,4-tetrahydro-quinazoline to form the dyestuff.

After suction-filtering and washing with water the aqueous press cake is stirred with 300 parts by volume of water and 200 parts by volume of methanol and heated under pressure for 2 hours at 150° C. The mixture is then worked up in the usual manner and 52 parts of a brilliant yellowish red pigment dyestuff possessing a good fastness to light and to solvents are obtained.

*Example 6*

From 15.7 parts of 1-amino-2-methoxy-5-chlorobenzene, 60 parts by volume of 5 N-hydrochloric acid and 20 parts by volume of 5 N-sodium nitrite solution a diazo solution is prepared in the usual manner which is added dropwise, while vigorously stirring, together with the solution of 36 parts of 6-(2'-hydroxy-3'-naphthoylamino)-2,4-dioxo-1,2,3,4,-tetrahydro-quinazoline in 150 parts by volume of 2 N-sodium hydroxide solution and 500 parts by volume of water, to a mixture of 400 parts by volume of water, 150 parts by volume of 2 N-acetic acid, 150 parts by volume of 4 N-sodium acetate solution and 15 parts by volume of a 10% aqueous solution of the reaction product of 1 mol of oleyl alcohol and 30 mols of ethylene oxide. When the coupling is complete, the product is worked up and after-treated in the manner described in Example 4.

52 parts of a claret pigment dyestuff possessing a good fastness to light and to solvents are obtained.

*Example 7*

20 parts of aluminum sulfate containing crystal water are dissolved in 200 parts by volume of water and precipitated with 80 parts by volume of 2 N-sodium carbonate solution. The alumina substratum formed is filtered off, washed with water, pasted up and added to a mixture of 100 parts by volume of 2 N-acetic acid, 100 parts by volume of 4 N-sodium acetate solution and 20 parts by volume of a 10% aqueous solution of the emulsifier described in Example 6.

To this suspension the solutions of the coupling component and diazo component prepared in the manner described in Example 1 are added dropwise within 30 minutes. When the coupling is complete, the mixture is heated for 30 minutes at 95° to 100° C. suction-filtered, washed thoroughly with water and dried at 80° C. 58 parts of a red pigment dyestuff are obtained which corresponds in its properties to the product described in Example 1.

*Example 8*

12.1 parts of 1-amino-6-methoxybenzene-3-carboxylic acid phenylamide are dissolved in 33 parts by volume of 5 N-hydrochloric acid and 100 parts by volume of ice water and diazotized at 0° to 5° C. with 10 parts by volume of 5 N-sodium nitrite solution. The clarified diazo solution is added dropwise within about 30 minutes, together with the solution of 18 parts of 6-(2'-hydroxy-3'-naphthoylamino)-2,4-dioxo-1,2,3,4-tetrahydro-quinazoline in 60 parts by volume of 2 N-sodium hydroxide solution and 200 parts by volume of water, to a mixture of 60 parts by volume of 2 N-acetic acid, 50 parts by volume of 4 N-sodium acetate solution and 10 parts by volume of a 10% aqueous solution of the reaction product of 1 mol of oleyl alcohol and 30 mols of ethylene oxide. When the coupling is complete, the monoazo-dyestuff is separated by filtration and the moist press cake is heated to boiling for two hours in 300 parts by volume of pyridine. After cooling the product is suction-filtered, washed with water and dried.

28 to 29 parts of a clear bluish red pigment dyestuff possessing a very good fastness to oil, a good fastness to light and a very good fastness to bleeding into polyvinyl chloride are obtained.

The after-treatment with pyridine can be carried out with the same result with the previously dried dyestuff. The after-treatment can be avoided by adding to the aqueous suspension of the dyestuff after coupling an emulsion of 40 parts of ortho-dichlorobenzene in 100 parts by volume of water prepared with 15 parts of the sodium salt of paraffinsulfamidoacetic acid (the basic paraffin radical corresponds to a hydrocarbon fraction of the boiling range between 180° and 210° C.) and then heating for 1 hour at 95° to 100° C. by introducing steam.

*Example 9*

31.1 parts of 1-amino-6-methoxybenzene-3-carboxylic acid-(2',5'-dichloro)-phenylamide are diazotized with 60 parts by volume of 5 N-hydrochloric acid, 300 parts by volume of ice water and 21 parts by volume of 5 N-sodium nitrite solution.

Furthermore, 36 parts of 6-(2'-hydroxy-3'-naphthoylamino)-2,4-dioxo-1,2,3,4-tetrahydro-quinazoline are dissolved in 400 parts by volume of water and 120 parts by volume of 2 N-sodium hydroxide solution and, after the addition of 10 parts by volume of a 10% aqueous solution of the reaction product of 1 mol of oleyl alcohol and 30 mols of ethylene oxide, the solution is added dropwise within about 30 minutes, while vigorously stirring, at room temperature together with the diazo solution to a buffer mixture consisting of 100 parts by volume of 4 N-sodium acetate solution, 120 parts by volume of 2 N-acetic acid, 200 parts by volume of water and 10 parts by volume of the above emulsifier solution. When the coupling is complete, the dyestuff is worked up and after-treated in the manner described in Example 8.

63 to 65 parts of a bluish-red pigment dyestuff possessing a very good fastness to light, to solvents and to migration are obtained.

*Example 10*

21.2 parts of 1-aminobenzene-3-carboxylic acid phenylamide are stirred overnight in 70 parts by volume of 5 N-hydrochloric acid and 350 parts by volume of water and then diazotized at 0° to 5° C., after the addition of ice with 20 parts by volume of 5 N-sodium nitrite solution. Into the diazo solution so prepared the alkaline solution of the coupling component is introduced after the addition of 120 parts by volume of 2 N-acetic acid, 50 parts by volume of 4 N-sodium acetate solution and 10 parts by volume of a 10% aqueous solution of the reaction product of 1 mol of oleyl alcohol and 30 mols of ethylene oxide, while vigorously stirring. The solution of the coupling component is prepared from 36 parts of 6 - (2' - hydroxy - 3' - naphthoylamino) - 2,4 - dioxo-1,2,3,4-tetrahydro-quinazoline, 400 parts by volume of water, 120 parts by volume of 2 N-hydrochloric acid and 10 parts by volume of a 10% aqueous solution of the sodium salt of the sulfuric acid ester of the reaction product from 2,4,6-tributylphenol with ethylene oxide. When the coupling is complete, 100 parts of ortho-dichlorobenzene are added, the mixture is stirred for 30 minutes at room temperature and then heated for 1 hour at 95° to 100° C. by introducing steam.

After working up 52 to 53 parts of a red powder are obtained which, when incorporated in polyvinyl chloride, yields a red dyeing of a good fastness to bleeding.

*Example 11*

29 parts of 1-amino-6-methoxybenzene - 3 - carboxylic acid-(2'-methyl-3'-chloro)-phenylamide are diazotized in the manner described in Example 10. In addition thereto 36 parts of 6-(2'-hydroxy-3'-naphthoylamino)-2,4-dioxo-1,2,3,4-tetrahydroquinazoline are dissolved in 400 parts by volume of water and 120 parts by volume of 2 N-sodium hydroxide solution. The diazo solution and the solution of the coupling component are then introduced simultaneously into the buffer solution of 200 parts by volume of water, 50 parts by volume of 4 N-sodium acetate solution, 120 parts by volume of 2 N-acetic acid, 8 parts of the sodium salt of paraffinamido acetic acid (the basic paraffin radical corresponds to a hydrocarbon fraction of the boiling range between 180° and 210° C.) and 8 parts of oleylamino acetate. When the coupling is complete, the mixture is heated for 20 minutes at 95° to 100° C. by introducing steam and then worked up in the usual manner.

78 to 80 parts of a bluish red pigment dyestuff of high tinctorial strength and a very good fastness to light, to solvents and to bleeding into undyed polyvinyl chloride are obtained.

A dyestuff of similar properties is obtained by using instead of oleylamino acetate another cation-active emulsifier, for example distearyl-dimethyl-ammonium chloride.

In the following table further components are listed which can be used in the process of the invention, and also the tints of the monoazo-dyestuffs prepared from these components.

| Diazo component | Coupling component | Tint |
|---|---|---|
| Aminobenzene | 6-(2'-hydroxy-3'-naphthoyl-amino)-2,4-dioxo-1,2,3,4-tetrahydro-quinazoline. | red. |
| 1-amino-2-chlorobenzene | do | red. |
| 1-amino-3-chlorobenzene | do | red. |
| 1-amino-4-chlorobenzene | do | red. |
| 1-amino-2-bromobenzene | do | red. |
| 1-amino-2-methylbenzene | do | red. |
| 1-amino-4-methylbenzene | do | red. |
| 1-amino-2-methoxybenzene | do | claret. |
| 1-aminobenzene-2-carboxylic acid ethyl ester. | do | red. |
| 1-aminobenzene-4-carboxylic acid methyl ester. | do | brown. |
| 1-amino-2-methyl-4-chlorobenzene. | do | red. |
| 1-amino-2-methyl-5-nitrobenzene. | do | red. |
| 1-amino-2-chloro-4-nitrobenzene. | do | claret. |
| 1-amino-2-chlorobenzene-4-carboxylic acid ethyl ester. | do | brown. |
| 1-amino-2-bromobenzene-5-carboxylic acid methyl ester. | do | red. |
| 1-amino-2-methoxy-4-nitrobenzene. | do | maroon. |
| 1-amino-2-methoxy-5-nitrobenzene. | do | bluish red. |

| Diazo component | Coupling component | Tint |
|---|---|---|
| 1-amino-2,5-dimethoxy-benzene | 6(2'-hydroxy-3'-naphthoyl-amino)-2,4-dioxo-1,2,3,4-tetrahydro-quinazoline. | claret. |
| 1-amino-2-methoxy-5-benzyl-sulfonylbenzene. | do | red. |
| 1-amino-3-chlorobenzene-4-carboxylic acid methyl ester. | do | red. |
| 1-amino-4-chlorobenzene-3-carboxylic acid ethyl ester. | do | red. |
| 1-aminobenzene-2,5-dicarboxylic acid methyl ester. | do | red. |
| 1-aminobenzene-2-carboxylic acid methyl ester-5-carboxylic acid amide. | do | red. |
| 1-aminobenzene-2-carboxylic acid methyl ester-5-carboxylic acid methyl-amide. | do | red. |
| 1-aminobenzene-2-carboxylic acid methyl ester-5-carboxylic acid phenyl-amide. | do | red. |
| 1-aminobenzene-3-carboxylic acid amide. | do | red. |
| 1-aminobenzene-3-carboxylic acid methylamide. | do | red. |
| 1-amino-6-chlorobenzene-3-carboxylic acid amide. | do | yellowish red. |
| 1-amino-6-chlorobenzene-3-carboxylic acid-(2'-chloro)-phenylamide. | do | Do. |
| 1-amino-6-chlorobenzene-3-carboxylic acid-(2',5'-dichloro)-phenylamide. | do | Do. |
| 1-amino-6-chlorobenzene-3-carboxylic acid-(2'-chloro-3'-methyl)-phenyl-amide. | do | Do. |
| 1-amino-6-methylbenzene-3-carboxylic acid amide. | do | red. |
| 1-amino-6-methylbenzene-3-carboxylic acid-(2'-chloro)-phenylamide. | do | red. |
| 1-amino-6-methylbenzene-3-carboxylic acid-(2',5'-dichloro)-phenylamide. | do | red. |
| 1-amino-6-methylbenzene-3-carboxylic acid-(2'-methyl-3'-chloro)-phenylamide. | do | red. |
| 1-amino-6-methoxybenzene-3-carboxylic acid amide. | do | bluish red. |
| 1-amino-6-methoxybenzene-3-carboxylic acid-(2'-chloro)-phenylamide. | do | Do. |
| 1-amino-6-methoxybenzene-3-carboxylic acid-(2',4'-dimethyl)-phenylamide. | do | Do. |
| 1-aminobenzene-4-carboxylic acid amide. | do | yellowish red. |
| 1-aminobenzene-4-carboxylic acid methylamide. | do | red brown. |
| 1-aminobenzene-4-carboxylic acid phenylamide. | do | red. |
| 1-amino-2-methoxy-benzene-5-sulfonic acid-iso-butylamide. | do | bluish red. |
| 1-amino-2-methoxy-benzene-5-sulfonic acid-cyclohexylamide. | do | Do. |
| 1-amino-2-methoxy-benzene-5-sulfonic acid-anilide. | do | red. |

We claim:
1. Water-insoluble monoazo-dyestuffs of the formula

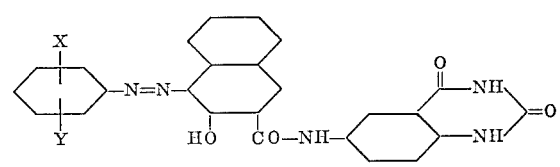

wherein X is a member of the group consisting of hydrogen, chlorine, methyl, methoxy, carboxylic acid methyl ester and carboxylic acid ethyl ester groups, and Y is a member of the group consisting of hydrogen, chlorine, bromine, methoxy, carboxylic acid methyl ester, carboxylic acid amide, carboxylic acid methyl amide, carboxylic acid phenyl amide, carboxylic acid mono-and dichlorophenyl amides, carboxylic acid chloro and methyl phenyl amides, carboxylic acid dimethyl phenyl amides, sulfonic acid butyl amides, sulfonic acid cyclohexyl amide, sulfonic acid phenyl amide, benzyl sulfonyl and nitro groups.

2. The water-insoluble monoazo-dyestuff of the formula

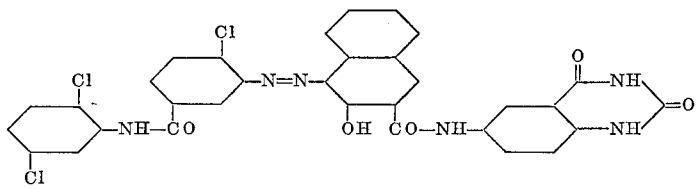

3. The water-insoluble monoazo-dyestuff of the formula

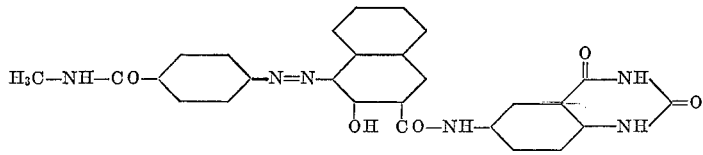

4. The water-insoluble monoazo-dyestuff of the formula

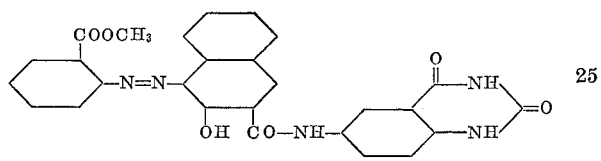

5. The water-insoluble monoazo-dyestuff of the formula

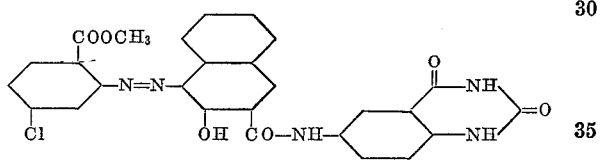

6. The water-insoluble monoazo-dyestuff of the formula

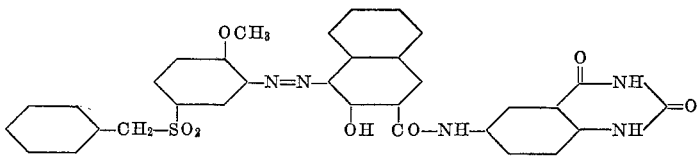

7. The water-insoluble monoazo-dyestuff of the formula

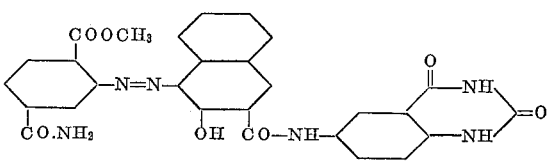

References Cited in the file of this patent
UNITED STATES PATENTS
2,908,678  Goebel et al. _____ Oct. 13, 1959